United States Patent Office 3,558,425
Patented Jan. 26, 1971

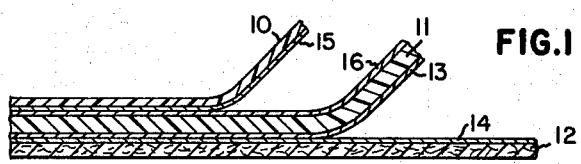
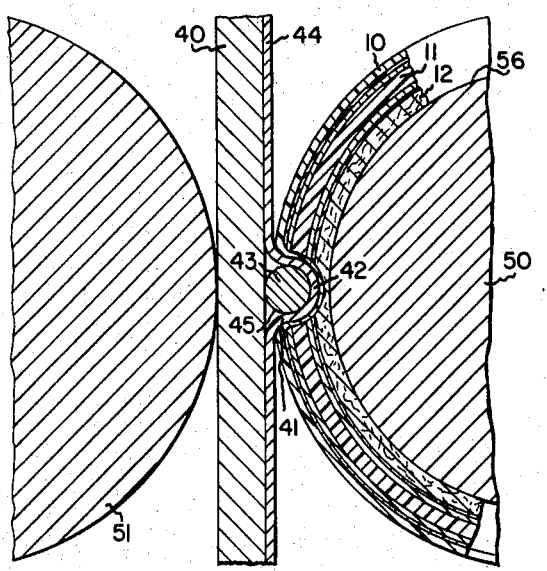
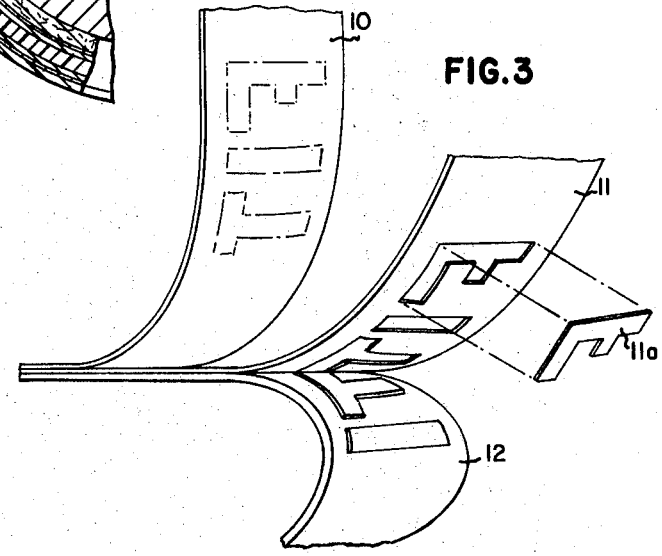
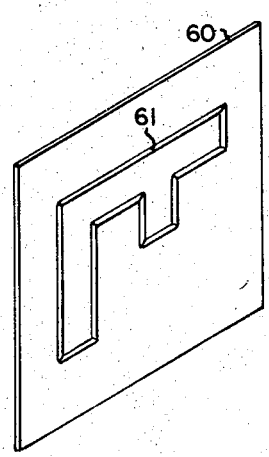

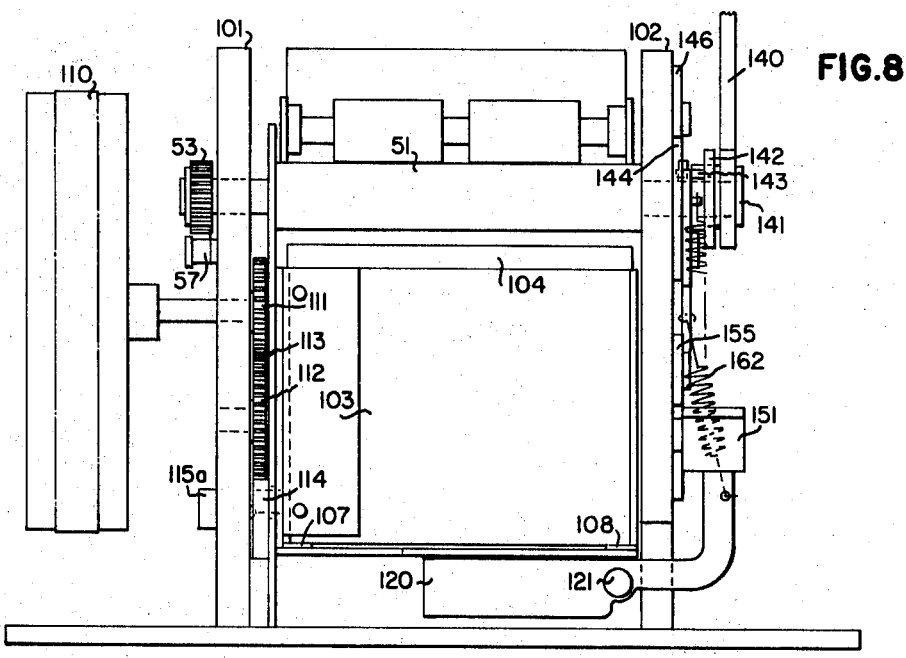

3,558,425
LAMINATED TAPE FOR PRINTING WITH A PRESSURE TRANSMITTING TOP LAYER TO SEVER AN INTERMEDIATE BRITTLE LAYER
Bernard J. Massari, 725 Hart Drive, Somerville, N.J. 08876
Filed Feb. 24, 1967, Ser. No. 618,540
Int. Cl. B32b 27/10, 27/36
U.S. Cl. 161—232                 18 Claims

ABSTRACT OF THE DISCLOSURE

A three layer laminated printing tape having an upper carrier layer to be embossed but uncut, an intermediate stencil layer to be cut during embossing of the outer layer and a lower support layer to be selectively cut or uncut in an arrangement such that the carrier and stencil layers may be stripped from the support layer and applied to a surface following which the carrier layer may be removed to leave the cut portions of the stencil layer adhering to the surface in the form of printing or ornamentations. A die plate of sheet material with a raised rounded die cutting ridge thereon is used to press and emboss through the outer layer to cut and separate the inner layer to the desired configuration and a machine for selecting a desired die plate and feeding it with the laminated tape through pressure rollers to accomplish the desired results is provided.

Cross references to related applications

This invention is not related to any pending applications to the best of applicant's knowledge.

BACKGROUND OF THE INVENTION

This invention pertains to the art of printing as defined by Class 101 of the United States Patent Office Classification.

Devices and techniques for cutting letters and forming stencils are well known but prior to this invention there have been no techniques by which desired letters may be cut in sequence and supported in a desired sequential positioned relation on a carrier tape or strip to be transferred therefrom to a permanent backing support in the same positioned arrangement to produce the desired printing or ornamentation. U.S. PATS. 666,468, 1,636,546, 2,370,-186 and 2,549,847 may be considered as typical of the closest prior art with which applicant is familiar.

Summary

In accordance with the invention, a three layer laminated tape is provided with an upper relatively thin and highly flexible carrier layer that will stretch without being separated or cut while being embossed. The intermediate or stencil layer is thicker than the upper layer and is relatively inflexible so that it is separated and cut by a rounded die surface as the die surface is impressed through the upper flexible carrier layer without cutting the upper layer. The lower or support layer is formed of a relatively thick, hard and inflexible material that will not be cut unless the raised die surface is higher than the thickness of both the intermediate and lower laminate layers as desired. To enable the selective stripping and adherence of the tape layers after embossing and cutting, the undersurface of each layer except the lower layer may be provided with a pressure sensitive adhesive coating. It is desirable that the adhesive coating on the undersurface of the intermediate layer have a greater tackiness than that of the upper outer layer so that the cut letters or ornamentation of the intermediate layer as supported on the upper carrier layer may be affixed to a permanent supporting surface following which the upper layer may be stripped from the intermediate layer to leave the cut printing or ornamentation of the intermediate layer affixed to the permanent support surface. To further facilitate the desired stripping of the tape layers, suitable release coatings may be applied to the upper surface of the lower and intermediate layers. In addition, if desired, the undersurface of the intermediate layer may be provided with a carbon black or ink transfer coating to produce printing on the upper surface of the lower support layer when the upper layer is embossed and the intermediate layer cut.

In order to obtain the desired embossing without cutting of the upper layer and the cutting of the inner layer alone or along with the lower layer of the tape laminate, a die comprising a sheet metal support plate having a raised and rounded die cutting and embossing ridge formed of suitably shaped and configured wire affixed thereto by resistance welding or the like is provided. The rounded embossing and cutting surface thus obtained is an important feature of the invention since such rounded surface will emboss and stretch the upper flexible tape layer without cutting it while penetrating into and separating to cut the relatively inflexible intermediate layer and if the wire diameter is greater than the combined thickness of the intermediate and lower layers, both such layers will be separated and cut by the die. A presently preferred form of the die is provided with a thin metal foil overlying the cutting wire and sheet metal support which facilitates the withdrawal of the cutting die from the printing tape without any tendency for the die side surfaces to key into the cut laminates as would sometimes be the case with an exposed wire die cutting surface.

The present invention provides an apparatus for selectively feeding desired die plates together with the laminar printing tape between pressure rollers so that the tape is progressively fed to the embossed and cut with a desired spacing automatically obtained between the successively cut, embossed and printed areas of the printing tape. A storage tray for a plurality of assorted dies is arranged to be indexed relative to a pair of pressure rollers between which the laminar tape is fed. Feed mechanism for rotating the rollers and feeding the die plate together with the laminar tape between the rollers is so designed that a first counterclockwise movement of the roller rotating means will advance a selected die plate into position between the rollers and overlying the laminar tape that is also fed between the rollers. A subsequent clockwise movement of the roller rotating means will rotate the rollers in a direction to feed the cutting die and laminar tape between the rollers so as to provide the desired embossing, cutting and printing of the tape layers as previously described. At the end of one full revolution of the pressure rollers, the die and tape will have been advanced far enough to complete the embossing, cutting and printing operations and the apparatus of the invention automatically provides for the separation of the die plate from the tape and its return to the storage magazine while stopping any further revolution of the rollers and their rotation means to feed the tape until another die has been selected and inserted between the pressure rollers.

DESCRIPTION OF THE DRAWINGS

FIG. 1 is a longitudinal sectional view of a portion of a preferred form of the laminar printing tape of the invention;

FIG. 2 is a view similar to FIG. 1 of a modified form of laminar printing tape of the invention;

FIG. 3 is an exploded perspective view of the laminar printing tape after cutting and as its layers may be separated;

FIG. 4 is a fragmentary sectional view showing the printing tape together with a die plate received between the pressure rollers of the apparatus of the invention at the time that the intermediate tape layer is cut;

FIG. 5 is a perspective view of one form of the embossing, cutting and printing die of the invention;

FIG. 8 is an end view as seen from the left of FIG. 6;

FIG. 9 is a fragmentary view to show the details of the die selecting and feeding mechanism;

FIG. 10 is a side view partly in section similar to FIG. 9 showing the die and laminar tape as they are fed between the pressure rollers;

FIG. 11 is a view similar to FIG. 10 but with the pressure rollers at the end of 360° of rotation at the time the cutting die is withdrawn from the laminar printing tape to fall back into the storage drawer at the end of an embossing, cutting and printing operation; and FIG. 12 is a fragmentary view of the gear rack die selection mechanism for indexing the die storage tray to register a desired die plate for feeding between the pressure rollers.

DESCRIPTION OF THE PREFERRED EMBODIMENTS

Figure 6:
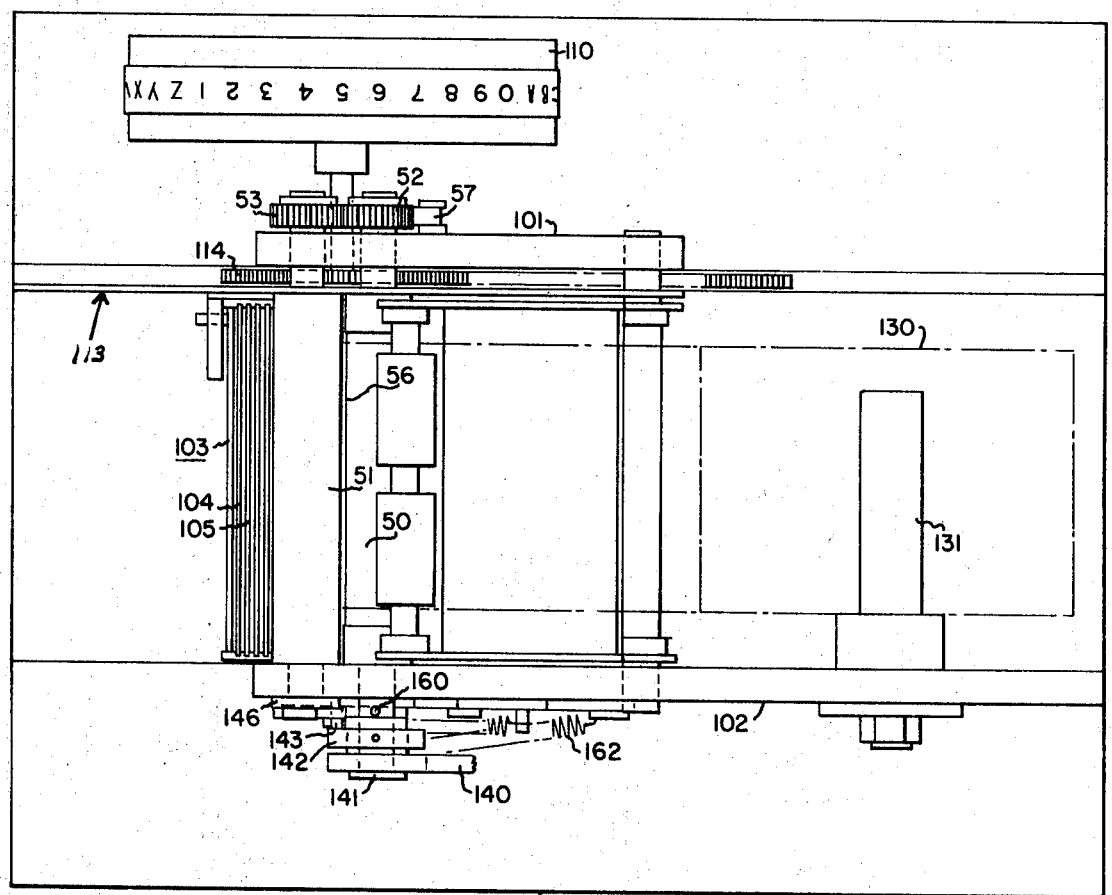
FIG. 6 is a top plan view of the printing apparatus of the invention.

Referring to FIG. 1 of the drawings, a presently preferred embodiment of the laminar printing tape of the invention is shown. The upper carrier layer 10 is formed of a relatively thin and highly flexible material such as a bi-axially oriented film of polyethylene terephthalate, an example of which is available from the Dupont Corporation under the trade name "Mylar." It has been found that the upper or carrier layer 10 when formed of the so-called polyester materials as referred to above should have a thickness of approximately .001 inch although some thicker or thinner films may be used provided that they will stretch without being cut during the embossing operation and that they can be easily handled during separation of the tape layers. A preferred characteristic of the polyester film for the upper layer 10 is that it is transparent. The intermediate printing layer 11 is formed of a relatively thick and inflexible material such as a film of cellulose acetate having a thickness of .003 inch to .004 inch. Other materials both plastic or paper may be used in place of the cellulose acetate, for the intermediate layer provided that they have the requisite characteristics of inflexibility and medium hardness as provided by cellulose acetate films. For example, thin coated or impregnated paper such as carbon paper may be used for the intermediate layer. The lower support layer 12 is formed of a semi-hard inflexible coated paper of relative greater thickness to the thickness of the upper carrier layer 10 and may preferably have a thickness of about .004 inch.

The lower or undersurface of the intermediate layer 11 is provided with a pressure sensitive adhesive coating 13 of any suitable formulation, many of which are well known to those skilled in the art. The upper surface of the lower support layer 12 is provided with a suitable release coating 14 which will prevent the intermediate layer 11 from adhering to the support layer 12 when the layers are separated as shown. Various release agents depending upon the type of pressure sensitive adhesive coatings to be used are well known to those skilled in the art and they need not be listed herein. The undersurface of the upper carrier layer 10 is also provided with a pressure sensitive adhesive coating 15 and the upper surface of the intermediate printing layer 11 is likewise provided with a release coating 16. However, it is very important to point out that the relative characteristics for the adhesive coatings 13, 15 and the release coatings 14, 16 should be selected to be such that layers 10 and 11 will adhere to each other while layer 12 is separated from layers 10 and 11 and such that layer 11 will subsequently adhere to a surface not provided with a release coating while layers 10 and 11 are being separated. In other words, the adhesive coating for the intermediate layer should have a greater tackiness than the adhesive coating for the upper layer 10. This desirable function will later be referred to in more detail.

A modified form of laminar tape of the invention is shown by FIG. 2 of the drawings in which the upper layer 20, intermediate layer 21 and lower layer 22 are the same as layers 10, 11, 12 of FIG. 1 except that no adhesive or release coatings on the various layers are provided. This form of the tape of the invention is useful when it is desired to produce a stencil with cut-out portions from the intermediate layer 21. Also, if the intermediate layer is comprise of carbon paper or the like, printing can be obtained on the upper surface of the lower layer 22 at the same time a stencil is formed of the intermediate layer 21. Of course, the stencil or cut-out portions formed from the intermediate layer may be caused to adhere to an adhesive coated surface to provide a desired ornamentation or printing.

FIG. 3 of the drawings shows how the upper carrier layer 10 remains uncut but is embossed with a suitable design while the intermediate layer 11 is cut to form a cut-out portion 11a while the layer support layer 12 is also not cut, the same as the upper layer 10. FIG. 4 of the drawings shows in detail how the aforementioned embossing and cutting of the various tape layers is obtained by using the preferred form of die plate of the invention.

The die plate is comprised of a plate backing member 40 having a die-cutting ridge 41 with a rounded upper surface 42. The ridge 41 is formed by a wire 43 of the desired configuration held in place on the facing surface of the plate 40 by means of a thin metal foil surface material 44. Suitable materials for such a die plate would be a sheet of C1095 carbon steel, .020 inch thick, hardened and tempered for the backing plate member 40 while the wire may be of any metal having a diameter of about .008 inch but is preferably annealed stainless steel that may be resistance welded in place on the surface of the backing plate 40. The metal foil 44 may be formed of C1010 AISI full steel of .0015 inch thickness known commercially as shim stock. When an adhesive coated foil 44 is used, it may not be necessary to weld the wire 43 in place on the plate 40 as the foil 44 will laminate and maintain the wire 43 in position.

When the die plate 40 together with the laminar printing tape including upper layer 10, intermediate layer 11 and lower layer 12 are simultaneously drawn between suitably spaced pressure rollers 50, 51, the rounded ridge surface 42 of the die will emboss and stretch the flexible upper layer 10 without cutting it while at the same time separating the fibers and cutting the inflexible intermediate layer 11 as shown. With the physical proportions for the die and tape as shown by FIG. 4, the lower support layer 12 of the tape will not be cut but it should be understood that the lower layer 12 can be selectively cut by increasing the relative height of the die ridge 42 so that it will also penetrate and cut the lower layer 12.

Figure 7:
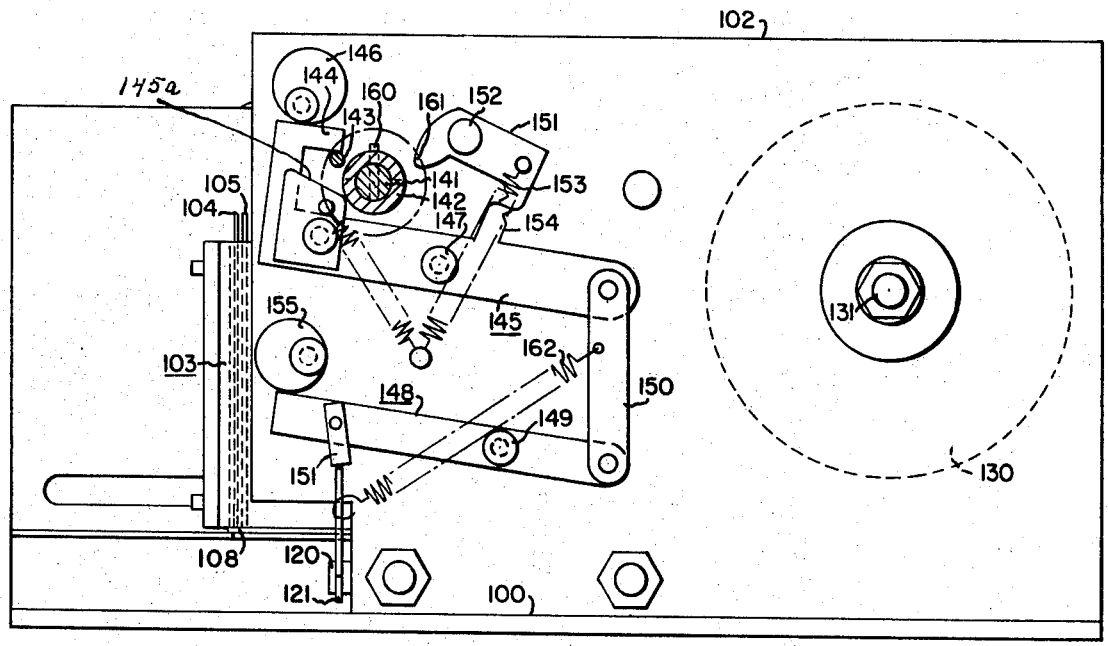
FIG. 7 is a side view similar to FIG. 6 but partly in section and showing in detail the linkage adjacent the operating handle for feeding a selected die between pressure rollers and rotating the rollers to advance the die and laminar tape therebetween.

FIG. 5 of the drawings shows a modified form of the die plate of the invention which is simply formed of a steel backing plate 60 having embossing and cutting ridges formed of configured wire 61 affixed thereto by resistance welding. The die plate shown by FIG. 4 of the drawings as having the outer foil surface covering 44 is presently preferred over the die plate shown by FIG. 5 since the inwardly extending surfaces 45 of the wire 43 are covered by the foil 44 and thus the tendency for the die to key or lock into engagement with the printing tape during embossing and cutting is prevented. Of course, an assortment of different die plates having various configurations of die ridge surfaces corresponding to letters, numbers and other indicia or ornamentation are provided. The width of the embossing and cutting ridges on the die plate will automatically predetermine the spacing of embossing, cutting and printing of successive items on the printing tape when using the printing apparatus of the invention to now be described in connection with FIGS. 6 through 12 of the drawings, since in such apparatus the printing tape is advanced between the pressure rollers only when a die plate is simultaneously advanced between the rollers so that the embossing ridge will thereby grip and advance the tape. Thus proportional spacing of the letters along the tape is obtained.

Referring to FIGS. 6 through 12 of the drawings, the printing machine is comprised of a base member 100 upon which are vertically mounted spaced side wall members 101, 102. A tray 103 adapted to contain a plurality of assorted die plates such as those shown at 104, 105, 106 is movably supported on guide rails 107 and 108 above the base 100 and between the side walls 101 and 102. The tray 103 may be indexed to position a desired die plate in registration with a point approximately between the pressure rollers 50 and 51 by rotation of the index wheel 110 that is connected by spur gearing 111, 112 and 113 to the rack gear 114 fixed longitudinally to the die plate tray 103. FIG. 12 shows the detail of how the teeth of the rack gear 114 are provided for the die plate supporting and guiding grooves in the tray 103 such as shown at 115 for the vertically positioned and spaced die plates in the tray 103. In order to provide a sensible indication of the position of the die plate tray 103 during rotation of the index wheel 110, a spring detent 115a is provided to engage longitudinally positioned notches along the side of the rack in registration with the grooves 115. In order to raise a desired die plate into engagement with the pressure rollers 50, 51 a pusher lever 120 pivoted at 121 is connected by linkage to be subsequently described to be movable to and from the dotted line position shown by FIG. 9 of the drawings.

The pressure rollers 50 and 51 are connected by spur gears 52, 53 to rotate together and it will be noted that at least one pressure roller such as the pressure roller 51 has a flat peripheral portion 54 which as shown by FIG. 11 of the drawings releases the pressure on the die plate 106 to allow the die plate to disengage from the printing tape and fall by gravity back into the tray 103 near the end of one full revolution of the rollers 50, 51 at the end of the printing and cutting operation. In this connection, it will be noted that the indexed position for the die tray 103 as shown by FIG. 10 of the drawings is such that a raised die plate is closer to its engaging roller 51 than the printing tape roller 50 so that the die plate 106 must flex slightly towards the pressure roller 50 when entering between the rollers 50, 51. Thus, the die plate will spring back out of engagement with the printing tape when the flat portion 54 of the roller 51 moves into the position shown by FIG. 11 of the drawings at the end of a printing step. Although it is not shown by the drawings, a spring pressed lever may be positioned above the pressure rollers 50, 51 to engage a raised die plate and force it back down into the storage tray 103 at the end of a printing operation when the rollers 50, 51 have assumed the positions shown by FIG. 11.

The printing tape as contained in a roll 130 is carried on a spindle 131 and is threaded up between the pressure rollers 50, 51. It will be noted that the pressure roller 50 is provided with a recessed surface 56 of a width equal to the width of the printing tape and a depth equal to slightly more than the thickness of the printing tape. Thus the spacing between the pressure rollers may be made approximately equal to the thickness of the backing plate 40 for each die plate and the height of the die ridge relative to the thickness of the printing tape will advance the tape as it engages the tape and also determine whether or not only the intermediate or both the intermediate and lower layers of the tape will be cut. It will be noted that no additional mechanism for feeding the printing tape is needed to be provided since the tape will be advanced between the pressure rollers only when and as the ridges of the die plate advance between the rollers, thus automatically proportionally spacing the printing on the tape.

In order to rotate the pressure rollers 50, 51 and advance a desired die plate with the printing tape between the rollers in the desired sequence, an operating handle with clutch and linkage is provided. The operating handle 140 is freely rotatable on the shaft portion 141 of the pressure roller 50. A collar 142 is fixed to the handle 140 for rotational movement therewith about the shaft portion 141 and carries a radially positioned pin 143 which normally engages a catch surface 144 of the pivotal trigger lever 145 to initially prevent clockwise rotation of the handle 140 and collar 142 since the trigger lever is thereby locked into engagement with the stop 146. A limited counterclockwise movement of the handle 140 is permitted which, by the engagement of the pin 143 with the abutment surface 145a of the trigger lever 145, causes such lever to pivot counterclockwise about the pivot point 147 to also pivot the lever 148 about the pivot point 149 through the link 150 downward into engagement with the end 151 of the die plate pusher lever 120. Thus, the pusher lever end 120 is raised and a selected die plate is raised and fed into position engaging the pressure rollers 50, 51 as shown by FIGS. 9 and 10 of the drawings. Also, during the counterclockwise movement of the trigger lever 145, the pawl 151 is pivoted clockwise about pivot point 152 by the spring 153 and locked in such position behind the trigger surface 154 of the trigger lever 145. The counterclockwise movement of the handle 140 and trigger lever 145 is limited by the adjustable stop 155 and the trigger surface 154 retains the trigger lever 145 in the counterclockwise position.

Thereafter, a clockwise movement of the handle 140 is permitted and will move the collar 142 with pin 143 into engagement with the pin 160 secured to the shaft extension 141 of the pressure roller 50 to rotate the pressure rollers 50, 51 and advance the die plate with the printing tape through the pressure rollers. A pawl 57 may be provided to prevent reverse rotation of the pressure rollers 50, 51. During clockwise rotation of the handle, the pin 143 engages the pawl surface 161 of pawl 151 to disengage the trigger lock 154 allowing the trigger lever 145 to move counterclockwise back to the locking position as shown in response to the tension of spring 162. Thus, at the end of approximately 360° of rotation for the pressure rollers 50, 51, the pin 143 of the collar 142 again engages the lock surface 144 of the trigger lever 145 to prevent any additional clockwise movement of the operating handle 140 and corresponding movement of the pressure rollers 50, 51. However, when the handle 140 is again moved counterclockwise to advance another die plate into position between the pressure rollers and to unlock the mechanism for clockwise rotation, the handle 140 may again be moved clockwise to rotate the pressure rollers 50, 51 through another 360° of rotation for another printing operation.

To summarize the operation of the printing apparatus of the invention, the index wheel 110, which is suitably marked, is first rotated to move the die tray 103 into position to index a selected die plate for movement between the pressure rollers. The operating handle 140 is thereafter first moved counterclockwise as far as possible to lift the selected die plate and bring it into position between the pressure rollers to be thereafter fed over the printing tape in the recess 56 of the pressure roller 50. Thereafter, the operating handle 140 is moved clockwise to cause the collar pin 143 to engage the roller pin 160 and rotate both of the pressure rollers 50, 51 through 360° of rotation. Thus, the printing tape and the die are advanced between the rollers. Near the end of 360° of rotation of the rollers 50, 51 the flat surface 54 of roller 51 reaches the position shown by FIG. 11 of the drawings to allow the die plate 106 to spring back out of engagement with the printing tape and drop back down into the die plate storage tray 103. Continued clockwise rotation of the handle 140 is arrested after 360° of rotation for the die rollers 50, 51, since during the clockwise movement of the handle, the trigger lever 145 was released from the catch 154 to return to the position shown with the locking surface 144 adapted to engage the collar pin 143 and prevent further clockwise movement of the collar 142 and handle 140.

As previously described, each printing operation of the handle 140 will cut through the intermediate tape layer 11 and if the embossing ridge on the die plate is high enough will also cut through the lower tape layer 12. Thus, for purposes of cutting a figure such as the capital letter A, the triangular inside portion of the letter may be formed and selectively cut through both the intermediate and lower layers of the printing tape by forming the die wire portions of the triangle from wire having a diameter great enough to cut through both layers 11 and 12 while the remaining portions of the letter may be cut through only the intermediate layer 11 provided that the corresponding die wire portions are formed with lesser diameter. Thus an entire series of cut figures or letters may be formed from the intermediate layer which, if pressure sensitive adhesive coatings are used as previously described, will adhere to the uncut upper carrier layer 10 while being removed from the lower layer 12. Thereafter, the adhesive surface of layer 11 may be pressed against a permanent surface and the upper carrier layer 10 separated therefrom to leave the cut intermediate layer fixed on the permanent surface. Thus, in such manner the spacing and positions of the figures applied to the permanent surface has been predetermined by their previous positions on the uncut carrier layer 10 that has been separated therefrom.

It will be obvious to those skilled in the art that many variations of uses for the printing tape and apparatus of the invention other than the few described are possible. For example, brief mention has been made above of the use of the invention for forming a stencil in the intermediate layer without an adhesive backing, and it will now be understood that, if the outer carrier layer is formed of a transparent film, both the outer layer and intermediate layer cut as a stencil may be affixed to an adhesive coated contrasting color permanent surface so that the contrasting color will show through the cut-out portions of the stenciled intermediate layer 11.

Various other modifications and uses of the invention will occur to those skilled in the art.

What is claimed is:

1. A tape for manufacturing a figure of discrete shape, comprising:
    a carrier layer of relatively thin and flexible material which stretches without being cut during embossing and is susceptible of receiving and transmitting cutting forces;
    a support layer of relatively hard material; and
    a continuous intermediate sheet layer disposed between said carrier layer and said support layer, said intermediate sheet layer comprising a material susceptible of being cut to form said figure of discrete shape by cutting forces transmitted thereto by said carrier layer, the material of said intermediate sheet layer being relatively inflexible and being of medium hardness so as to be more brittle than the material of said carrier layer.

2. A tape according to claim 1 and further including:
    a coating of adhesive substance on the surface of said carrier layer adjacent said intermediate sheet layer for removably securing said carrier layer to said intermediate sheet layer;
    a coating of adhesive substance on the surface of said intermediate sheet layer adjacent said support layer for removably securing said intermediate sheet layer to said support layer, whereby after said figure of discrete shape is cut, said carrier layer and said figure of discrete shape may be separated from the remaining portions of said tape, said figure of discrete shape adhesively secured to a surface, and said carrier layer separated from said figure of discrete shape.

3. A tape according to claim 2 and further including a coating of release material on the surface of said support layer adjacent said intermediate sheet layer, said release material cooperating with said adhesive substance on said intermediate sheet layer to provide less adhesion between said support and intermediate layers than is established between said carrier and intermediate layers.

4. A tape for manufacturing a figure of discrete shape, comprising:
    a carrier layer of bi-axially oriented polyethylene terephthalate which stretches without being cut during embossing and is susceptible of receiving and transmitting cutting forces;
    a support layer of relatively hard material; and
    a continuous intermediate sheet layer disposed between said carrier layer and said support layer, said intermediate sheet layer being relatively inflexible and being of medium hardness so as to be susceptible of being cut to form said figure of discrete shape by cutting forces transmitted thereto by said carrier layer.

5. The tape of claim 1 and further including:
    a coating of adhesive substance on the surface of said carrier layer adjacent said intermediate sheet layer for removably securing said carrier layer to said intermediate sheet layer; and
    a coating of adhesive substance on the surface of said intermediate sheet layer adjacent said support layer for removably securing said intermediate sheet layer to said support layer.

6. The tape of claim 5 and further including:
    a coating of release material on the surface of said support layer adjacent said intermediate sheet layer, said release material cooperating with said adhesive substance on said intermediate sheet layer to provide less adhesion between said support and intermediate layers than is established between said carrier and intermediate layers.

7. The tape of claim 6 and further including a coating of release material on the surface of said intermediate sheet layer adjacent said carrier layer, said release material on said intermediate sheet layer cooperating with the adhesive substance on said carrier layer to define an adhesive bond having greater adhesion than the adhesive bond between said intermediate and support layers and less adhesion than the adhesive bond between said intermediate sheet layer and a surface not provided with a coating of release material.

8. A tape for manufacturing a stencil having one or more discrete openings, comprising:
    a carrier layer of relatively thin and flexible material which stretches without being cut during embossing and is susceptible of receiving and transmitting cutting forces;
    a support layer of relatively hard material;
    a continuous intermediate sheet layer disposed between said carrier layer and said support layer, said intermediate sheet layer comprising a layer of material being relatively inflexible and being of medium hardness so as to be susceptible of being cut to form said figure of discrete shape by cutting forces transmitted thereto by said carrier layer, and
    said intermediate sheet layer being removable from said carrier layer and said support layer subsequent to the formation of said discrete openings to provide said stencil.

9. A tape according to claim 8 and further including a coating of adhesive substance on a surface of said carrier layer adjacent said intermediate layer.

10. The tape of claim 8 and further including:

a coating of adhesive substance on the surface of said intermediate layer adjacent said support layer.

11. A tape according to claim 4 wherein said intermediate sheet layer is a layer of plastic.

12. A tape according to claim 4 wherein said intermediate sheet layer is a layer of paper.

13. A tape according to claim 4 wherein said intermediate sheet layer is a film of cellulose acetate.

14. A tape for manufacturing a figure of discrete shape, comprising:
- a first layer of material which stretches without being cut during embossing and is susceptible of receiving and transmitting cutting forces,
- a second sheet layer of material being relatively inflexible and being of medium hardness so as to be susceptible of being cut to form said figure of discrete shape by cutting forces transmitted thereto by said first layer,
- the material of said first layer being more thin and flexible than the material of said second sheet layer,
- a first adhesive coating provided on the surface of said first layer of material adjacent said second sheet layer of material, and
- said first layer of material removably secured to said second sheet layer of material by said first adhesive coating,
- a second adhesive coating provided on the surface of said second sheet layer of material on the surface thereof opposite said first layer of material, 15. A tape according to claim 14 wherein said first layer of material is comprised of bi-axially oriented polyethylene.

16. A tape according to claim 14 wherein said second sheet layer of material is a layer of plastic.

17. A tape according to claim 14 wherein said second sheet layer of material is a layer of paper.

18. A tape according to claim 14 wherein said second sheet layer of material is a layer of cellulose acetate.

References Cited

UNITED STATES PATENTS

| | | | |
|---|---|---|---|
| 2,927,868 | 3/1960 | Revoir | 117—76 |
| 2,961,365 | 11/1960 | Sroog | 161—232X |
| 3,011,383 | 12/1961 | Sylvester et al. | 88—1 |
| 3,036,945 | 5/1962 | Souza | 161—411 |
| 3,047,443 | 7/1962 | Anderson | 161—138 |
| 3,192,100 | 6/1965 | Morgan | 161—165 |
| 3,294,571 | 12/1966 | Ernst | 117—36.3 |
| 3,332,829 | 7/1967 | Avery | 161—33 |
| 3,379,560 | 4/1968 | Tharp | 117—121 |

JOHN T. GOOLKASIAN, Primary Examiner

C. B. COSBY, Assistant Examiner

U.S. Cl. X.R.

161—231, 251, 269, 402, 406